(12) United States Patent
Murai et al.

(10) Patent No.: US 7,313,280 B2
(45) Date of Patent: Dec. 25, 2007

(54) IMAGE PROCESSING DEVICE, IMAGE PROCESSING METHOD, AND IMAGE PROCESSING PROGRAM

(75) Inventors: Kiyoaki Murai, Matsumoto (JP); Hidekuni Moriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 759 days.

(21) Appl. No.: 10/779,757

(22) Filed: Feb. 18, 2004

(65) Prior Publication Data

US 2004/0247199 A1 Dec. 9, 2004

(30) Foreign Application Priority Data

Mar. 14, 2003 (JP) ............................. 2003-070530

(51) Int. Cl.
*G06K 9/62* (2006.01)
(52) U.S. Cl. ...................... 382/228; 382/170; 382/274
(58) Field of Classification Search ................ 382/160, 382/168, 274, 170, 228
See application file for complete search history.

(56) References Cited

U.S. PATENT DOCUMENTS

| | | | |
|---|---|---|---|
| 4,694,329 A | 9/1987 | Belmares-Sarabia et al. | |
| 4,823,184 A | 4/1989 | Belmares-Sarabia et al. | |
| 5,239,378 A | 8/1993 | Tsuji et al. | |
| 5,241,386 A | 8/1993 | Tsuji et al. | |
| 5,432,556 A | 7/1995 | Hatano et al. | |
| 5,751,401 A * | 5/1998 | Takaoka et al. | 355/32 |
| 7,106,887 B2 * | 9/2006 | Kinjo | 382/118 |
| 7,113,648 B1 * | 9/2006 | Aihara | 382/274 |
| 2004/0001165 A1 | 1/2004 | Shiota et al. | |
| 2004/0201782 A1 | 10/2004 | Murai et al. | |
| 2004/0247199 A1 * | 12/2004 | Murai et al. | 382/274 |
| 2005/0008246 A1 * | 1/2005 | Kinjo | 382/254 |
| 2005/0207669 A1 * | 9/2005 | Kameyama | 382/274 |
| 2005/0286061 A1 * | 12/2005 | Kurumisawa | 358/1.9 |

FOREIGN PATENT DOCUMENTS

| | | |
|---|---|---|
| CN | 1531332 A | 9/2004 |
| EP | 0 501 728 A2 | 9/1992 |
| EP | 0 528 105 A1 | 2/1993 |
| EP | 1 359 746 A1 | 11/2003 |
| JP | A-04-271669 | 9/1992 |

(Continued)

OTHER PUBLICATIONS

Van Wijk, Jarke, J., "Image Based Flow Visualization", 2002.7, pp. 10/1-10/10, Technische Universiteit Eindhoven, Dept. of Mathematics and Computer Science.

*Primary Examiner*—Gregory M Desire
(74) *Attorney, Agent, or Firm*—Oliff & Berridge, PLC

(57) ABSTRACT

The invention provides an image processing device capable of reducing flickering on a screen by simplifying the structure of an image processing device. The image processing device can include a statistical value calculating unit, a correction parameter calculating unit, and an image correcting unit. The statistical value calculating unit can generate statistical value data. The correction parameter calculating unit generates a control signal in accordance with the degree of change in the scene thereby generating a correction parameter by using a low pass filter whose time constant changes based on the control signal and equalizing the statistical value data. A look-up table can then be generated based on the correction parameter.

6 Claims, 8 Drawing Sheets

FOREIGN PATENT DOCUMENTS

| | | |
|---|---|---|
| JP | A-04-293365 | 10/1992 |
| JP | B2 7-99862 | 10/1995 |
| JP | A-08-153197 | 11/1996 |
| JP | B2 2972095 | 8/1999 |
| JP | A 2001-103338 | 4/2001 |
| JP | A 2001-343957 | 12/2001 |
| JP | A 2002-77723 | 3/2002 |
| JP | A 2002-142132 | 5/2002 |
| JP | A 2002-262303 | 9/2002 |
| JP | A-2002-320111 | 10/2002 |
| JP | 2002-359754 | 12/2002 |
| JP | A-2002-369003 | 12/2002 |
| JP | A-2003-304417 | 10/2003 |
| JP | A-2003-309763 | 10/2003 |
| JP | A-2004-007301 | 1/2004 |

\* cited by examiner

F I G. 1
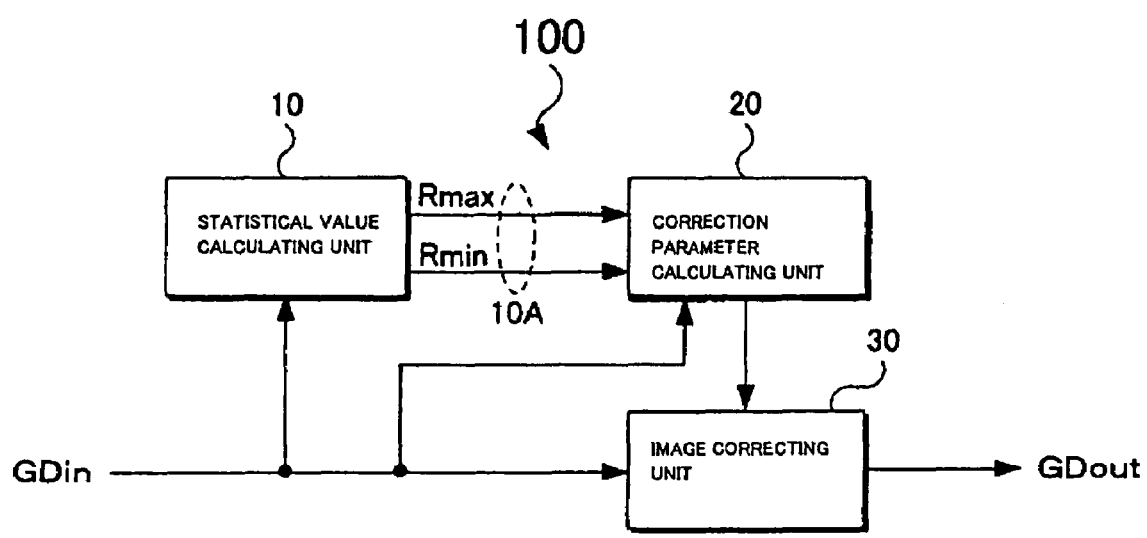

FIG. 8

| FRAME RATE | A1 | B1 |
|---|---|---|
| 30 fps OR MORE | 6/8 | 2/8 |
| 10~30fps | 5/8 | 3/8 |
| 10 fps OR LESS | 4/8 | 4/8 |

IMAGE PROCESSING DEVICE, IMAGE PROCESSING METHOD, AND IMAGE PROCESSING PROGRAM

BACKGROUND OF THE INVENTION

1. Field of Invention

The present invention relates to an image processing device for performing image correction processing on image data, an image processing method, and an image processing program.

2. Description of Related Art

In an image process, the characteristics of images on one scene are statistically interpreted, thereby performing image correction processing on image data based on the interpretation result. As a statistical interpretation method, a method of obtaining the distribution (a histogram) of the frequencies of gray levels to calculate a correction parameter from the histogram is known.

In the case where the correction parameter significantly changes among frames when moving images are processed, the contrast or the brightness of the entire screen changes thereby causing flickering of the image. Furthermore, when noise overlaps the image data, the image flickering is increased. In order to solve the above problem, a technology for increasing the time constant of changes in the distribution of the histogram by passing the data on the distribution of the histogram through a cyclic filter circuit when the histogram is generated, is known, thereby preventing fluctuation of the corrected image data, as described in Japanese Examined Patent Application Publication No. 7-99862 (see, for example, Paragraph Number 0018).

SUMMARY OF THE INVENTION

However, in the case of passing through a cyclic filter when generating a histogram, which is a source of statistical value calculations, there are problems in that the size of the circuit increases, thereby requiring a large amount of time for processing the data. In particular, in portable electronic apparatuses, such as mobile telephones, a reduction in the size of circuits and an increase in the speed of processing data become a significant concern in view of the miniaturization of devices and a reduction in power consumption.

The invention was made in consideration of such problems. Therefore, an object of the present invention is to provide an image processing apparatus having a simple structure, an image processing method, and an image processing program capable of reducing flickering on a screen.

In order to achieve the above object, an image processing device according to the present invention performs image processing on image data, and can include a statistical value calculating device for performing statistical processing on the image data to generate statistical value data representing statistical values, a scene detecting device for generating a control signal in accordance with the degree of change in a scene based on the image data, a correction parameter calculating device for weighting the statistical value data of a plurality of frames based on the control signal to calculate a correction parameter, and an image correcting device for performing image correction processing on the image data based on the correction parameter.

According to the present invention, it does not equalize the correction parameter during calculating the statistical values, such as a histogram or an accumulative histogram, but the statistical values are weighted after obtaining statistical values. In a process of generating the statistical values, since it is necessary to process image data in units of pixels, an operation circuit is large-scaled thereby increasing processing load. On the contrary, according to the present invention, since the correction parameter is equalized by weighting after obtaining the statistical values, it is possible to simplify the structure of the image processing device. Furthermore, since the weighting may change in accordance with the degree of change in the scene, it is possible to improve the response characteristics of the correction parameter with respect to changes in images. Therefore, it is possible to correct images in accordance with change in the scene, that is, for example, it is possible to display clear images when scenes change.

It is preferable that the correction parameter calculating device generates the correction parameter by performing calculations in which the weighting on statistical value data of a previous frame is smaller as the degree of change in the scene represented by the control signal is larger. Since the continuity of the statistical values is lost due to an increase in the degree of change in the scene, it is possible to improve the response characteristics of the correction parameter by reducing the weighting of the statistical value data in a previous frame.

It is preferable that the correction parameter calculating device include a storing device for storing statistical value data obtained in a previous frame, a counting device for multiplying coefficients by statistical value data in the current frame and the previous statistical value data read from the storing device, respectively, and a coefficient controlling device for changing the coefficients based on the control signal.

It is preferable that when statistical value data of the current frame is $S(n)$, a correction parameter of the frame prior to the current frame by one frame is $P(n-1)$, a first coefficient is $A$, and a second coefficient is $B$, the above correction parameter calculating device calculate a correction parameter $P(n)$ of the current frame in accordance with the equations below and controls the values of the first coefficient and the second coefficient based on the control signal, and the equations are $P(n)=A*S(n)+B*P(n-1)$ and $1=A+B$. In this case, it is possible to generate the correction parameter by a cyclic low pass filter.

It is preferable that the correction parameter calculating device detects a frame rate of the image data and weights the statistical value data of the plurality of frames based on the detected frame rate and the control signal. In this case, since it is possible to determine the correction parameter in consideration of the frame rate, it is possible to appropriately correct images according to the density of a frame.

According to the present invention, an image processing method performs image processing on image data, and can include the steps of performing statistical processing on the image data to generate statistical value data representing statistical values, generating a control signal in accordance with the degree of change in a scene based on the image data, weighting the statistical value data of a plurality of frames based on the control signal to calculate a correction parameter, and performing image correction processing on the image data based on the correction parameter.

According to the present invention, since the correction parameter is equalized by weighting after obtaining the statistical values, it is possible to simplify the structure of the image processing device. Furthermore, since it is possible to change the weighting in accordance with the degree of change in the scene, it is possible to improve the response characteristics of the correction parameter with respect to changes in images. Therefore, it is possible to correct images in accordance with change in the scene, that is, for example, it is possible to display clear images when scenes change.

According to the present invention, an image processing program performs image processing on image data, and makes a computer function as statistical value a calculating device for performing statistical processing on the image data to generate statistical value data representing statistical values, a scene detecting device for generating a control signal in accordance with the degree of change in a scene based on the image data, a correction parameter calculating device for weighting the statistical value data of a plurality of frames based on the control signal to calculate a correction parameter, and an image correcting device for performing image correction processing on the image data based on the correction parameter. According to the present invention, since the correction parameter is equalized by weighting after obtaining the statistical values, it is possible to significantly reduce the processing load.

BRIEF DESCRIPTION OF THE DRAWINGS

The invention will be described with reference to the accompanying drawings, wherein like numerals reference like elements, and wherein:

FIG. 1 is an exemplary block diagram illustrating the structure of an image processing device according to a first embodiment of the present invention;

FIG. 8 illustrates a relationship between a frame rate and a first coefficient A and a second coefficient B in an image processing device according to a modification.

DETAILED DESCRIPTION OF PREFERRED EMBODIMENTS

An embodiment of an image processing device according to the present invention will now be described with reference to the drawings. FIG. 1 is an exemplary block diagram illustrating the structure of an image processing device according to a first embodiment. Input image data GDin is supplied to an image processing device 100. The input image data GDin represents gray-scale values to be displayed on individual pixels constituting one scene. The input image data GDin according to the present embodiment is moving image data of eight bits per a pixel. Therefore, the input image data GDin represents 256 gray-scale levels. The minimum value is '0' and the maximum value is '255'. The image processing device 100 performs statistical processing on the input image data GDin to generate the statistical values and performs correction processing on the input image data GDin using the statistical values to generate output image data GDout.

Figure 2:
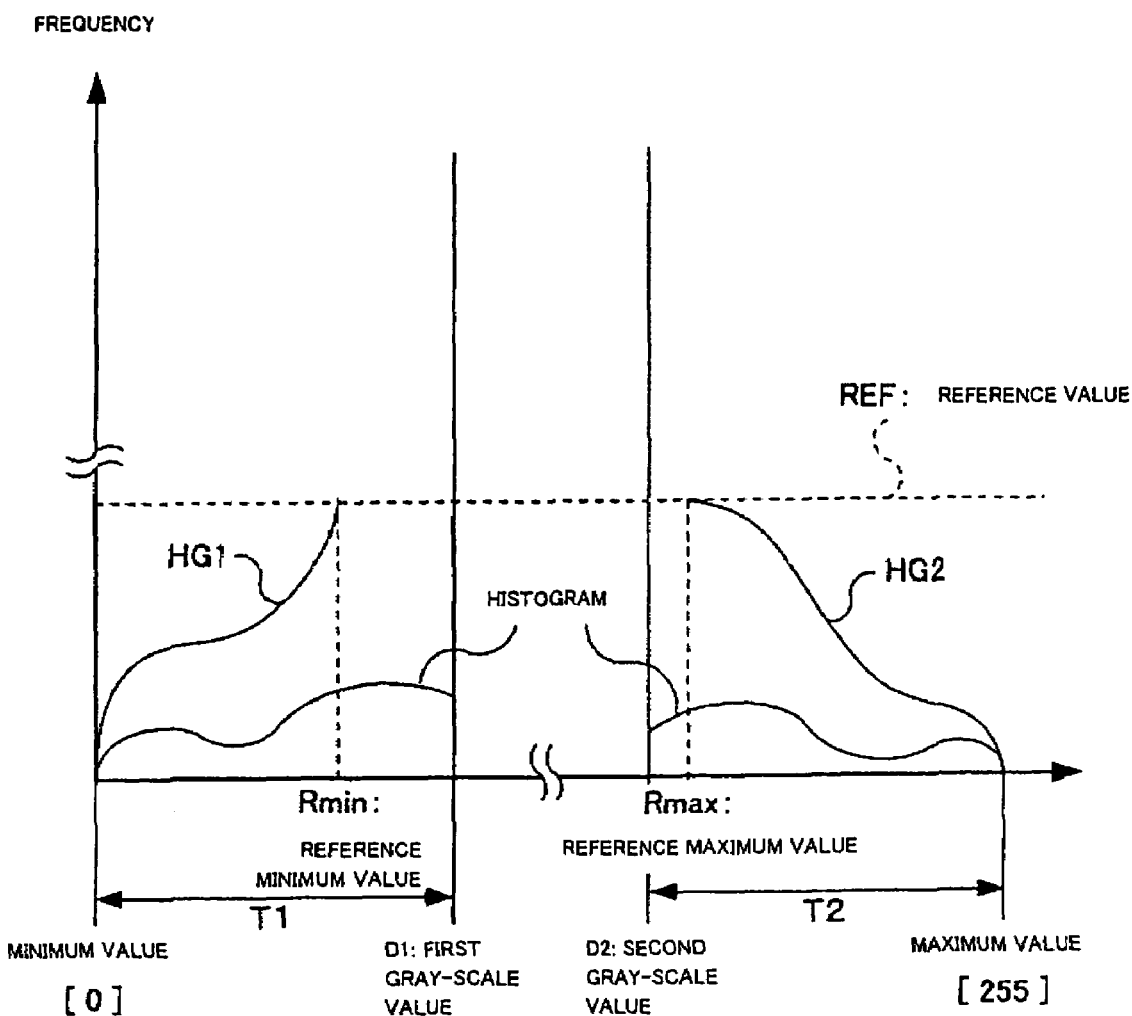
FIG. 2 schematically illustrates a statistical calculation process.

The image processing device 100 can include a statistical value calculating unit 10, a correction parameter calculating unit 20, and an image correcting unit 30. The statistical value calculating unit 10 performs predetermined statistical processing on the input image data GDin, thereby generating statistical value data 10A. The statistical calculation processing is schematically described with reference to FIG. 2. According to the statistical calculation process, accumulative histograms HG1 and HG2 are generated directly in both directions in a first range T1 from the minimum value (0) to a first gray-scale value D1 and in a second range T2 from the maximum value (255) to a second gray-scale value D2. Points at which the frequencies of the generated accumulative histograms HG1 and HG2 reach a predetermined reference value REF are specified as a reference minimum value Rmin and a reference maximum value Rmax, thereby generating the statistical value data 10A which represents the reference minimum value Rmin and the reference maximum value Rmax. Furthermore, the second gray-scale value D2 is larger than the first gray-scale value D1.

The accumulative histogram represents the frequency obtained by gathering the frequencies of the histogram in a predetermined direction (a direction from the minimum value to the maximum value or from the maximum value to the minimum value) at each level.

The width of a level can be arbitrarily determined. However, the width of the level according to the present embodiment is one gray-scale level. According to the present embodiment, two kinds of accumulative histograms are simultaneously generated. That is, the accumulative histogram HG1 from the minimum value to the first gray-scale value D1 and the accumulative histogram HG2 from the maximum value to the second gray-scale value D2 are generated.

The correction parameter calculating unit 20 generates a look-up table LUT based on the statistical value data 10A. The respective gray-scale values of the input image data GDin and the respective corrected gray-scale values corresponding to the gray-scale values of the input image data GDin are stored in the look-up table LUT. The stored contents are updated based on the statistical value data 10A. The image correcting unit 30 generates the output image data GDout with reference to the look-up table LUT. To be specific, the image correcting unit 30 reads the gray-scale values of the input image data GDin, uses them as addresses to access to the look-up table LUT, and outputs the gray-scale values read from the look-up table LUT as the output image data GDout.

Figure 3:
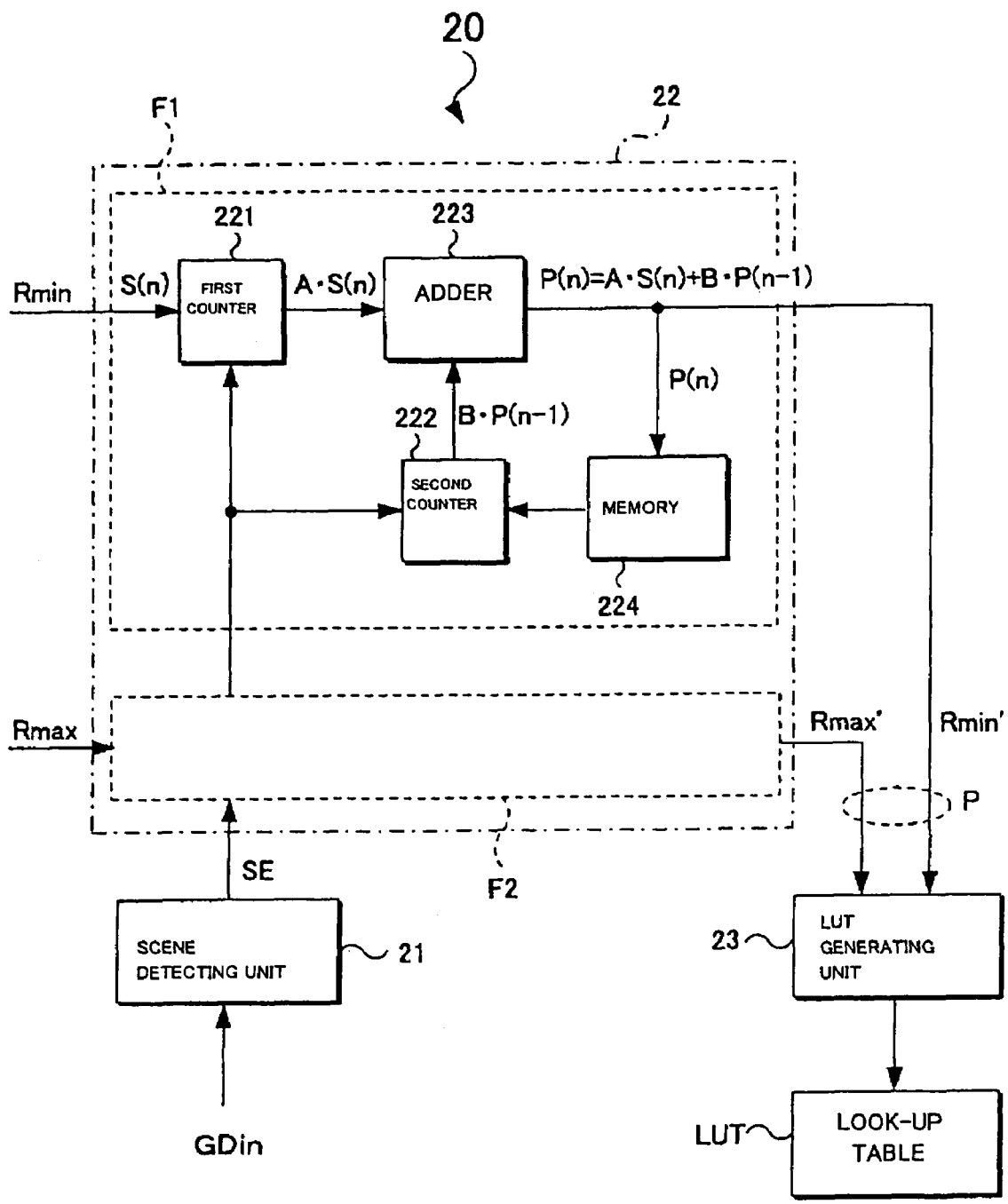
FIG. 3 is an exemplary block diagram illustrating the structure of a correction parameter calculating unit 20.

FIG. 3 illustrates a detailed structure of the correction parameter calculating unit 20. The correction parameter calculating unit 20 can include a scene detecting unit 21, a calculating unit 22, a LUT generating unit 23, and a look-up table LUT.

The scene detecting unit 21 generates a control signal SE representing the degree of change in the scene from frame to frame based on the input image data GDin. Changes in the scene can be detected based on the correlation of images from frame to frame. For example, it is possible to calculate a difference value between the average brightness of the current frame and the average brightness of a frame prior to the current frame by one frame and thereby generate the control signal SE based on the difference value. The values of the control signal SE may be continuous or discrete. According to the present embodiment, the difference value is compared with a first reference value r1 and a second reference value r2, thereby grading the degree of change in the scene in three stages. In this case, r1<r2.

When the difference value is less than the first reference value r1, the value of the control signal SE is '0'. In this case, it means that almost no change occurs in the scene. When the difference value is not less than the first reference value r1 but less than the second reference value r2, the value of the control signal SE is '1'. In this case, it means that change occurs a little in scenes. Furthermore, when the difference value is not less than the second reference value r2, the value of the control signal SE is '2'. In this case, it means that change occurs in the scene. Furthermore, according to the present embodiment, the control signal SE is generated using the average brightness. However, it should be understood that the degree of change in the scene may be detected based on any statistical values.

The calculating unit 22 includes a first cyclic filter F1 and a second cyclic filter F2. The cyclic filters F1 and F2, which operate as low pass filters, prevent the occurrence of rapid changes in the reference minimum value Rmin and the reference maximum value Rmax, thereby generating a correction parameter P. The first cyclic filter F1 includes a first counter 221, a second counter 222, an adder 223, and a memory 224. The second cyclic filter F2 has the same structure as that of the first cyclic filter F1. Therefore, a detailed description of the second cyclic filter F2 is omitted.

The first counter 221, which includes a multiplication circuit, multiplies the reference minimum value Rmin by a first coefficient A and outputs the multiplication result to the adder 223. The second counter 222, which includes a multiplication circuit, multiplies a correction parameter P(n−1) one frame before by a second coefficient B and outputs the multiplication result to the adder 223. The adder 223 adds the output signal of the first counter 221 to the output signal of the second counter 222 and generates a correction parameter P(n). The memory 224, which operates as means for delaying by one frame, stores the correction parameter P(n) and outputs the correction parameter P(n) to the next frame. Therefore, the correction parameter P(n−1) of a frame prior to the current frame by one frame is output from the memory 224.

According to the above structure, the correction parameter P(n) of the current frame is obtained by the following equation.

$$P(n)=A*S(n)+B*P(n-1) \text{ and } 1=A+B$$

The reference minimum value Rmin of the current frame is S(n) and the correction parameter of the frame prior to the current frame by one frame is P(n−1).

The values of the first coefficient A and the second coefficient B are selected based on the control signal SE. For example, when the value of the control signal SE is '0' (when almost no changes occur in the scenes), then A=B=½. When the value of the control signal SE is '1' (when change occurs a little in scenes), then A=¾ and B=¼. When the value of the control signal SE is '2' (change occurs in the scene), then A=1 and B=0.

In other words, as the degree of change in the scene, which is represented by the control signal SE, is large, it is preferable to generate the correction parameter P by performing calculations in which the weighting on the statistic value data of a previous frame is small.

Figure 4A:
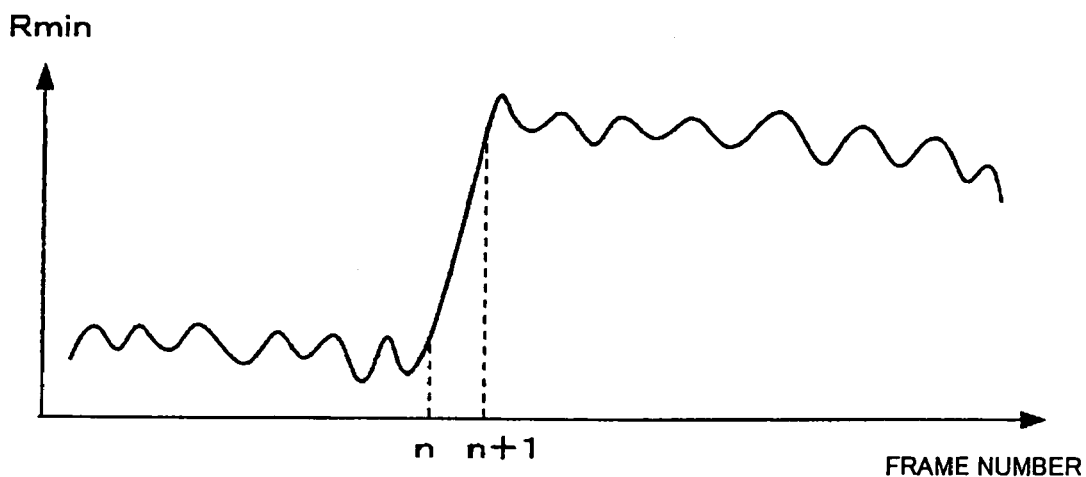
FIG. 4 illustrates an operation of a first cyclic filter F1.

FIG. 4 illustrates examples of input-output characteristics of the first cyclic filter F1. The reference minimum value Rmin changes as illustrated in FIG. 4(A). According to the present examples, a high frequency component having a small amplitude is included in the reference minimum value Rmin. The value of the reference minimum value Rmin significantly changes between an n-th frame and an (n+1)-th frame. When moving images are corrected, if the correction parameter P changes with a short period, the flickering occurs on the screen when the moving images are viewed.

Figure 4B:
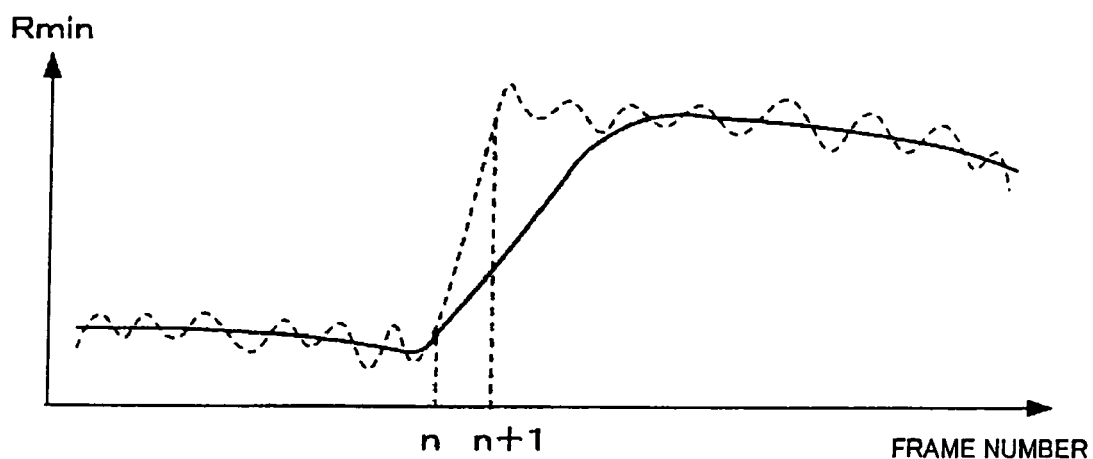

When the values of the first coefficient A and the second coefficient B are fixed, regardless of the degree of change in the scene, the output of the first cyclic filter F1 is illustrated in FIG. 4(B). In this case, it is possible to remove the high-frequency component having the small amplitude that overlaps the reference minimum value Rmin. However, the response between the n-th frame and the (n+1)-th frame, in which change occurs in the scene, is delayed.

Figure 4C:
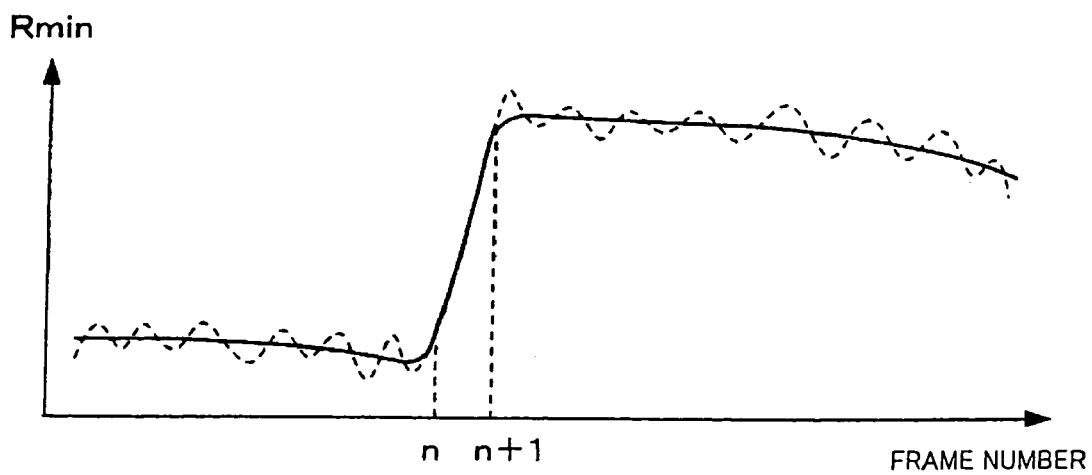

According to the present embodiment, the first coefficient A and the second coefficient B change in accordance with the degree of change in the scene. Therefore, the output of the first cyclic low pass filter F1 is illustrated in FIG. 4(C). The high frequency component having the small amplitude, which overlaps the reference minimum value Rmin, is removed, thereby improving the response characteristics significantly. As a result, it is possible to display clear images when the scene changes.

The LUT generating unit 23 illustrated in FIG. 3 stores predetermined data in the look-up table LUT based on the correction parameter P output from the calculating unit 22. The correction parameter P includes a corrected reference minimum value Rmin' output from the first cyclic filter F1 and a corrected reference maximum value Rmax' output from the second cyclic filter F1.

Figure 5A:
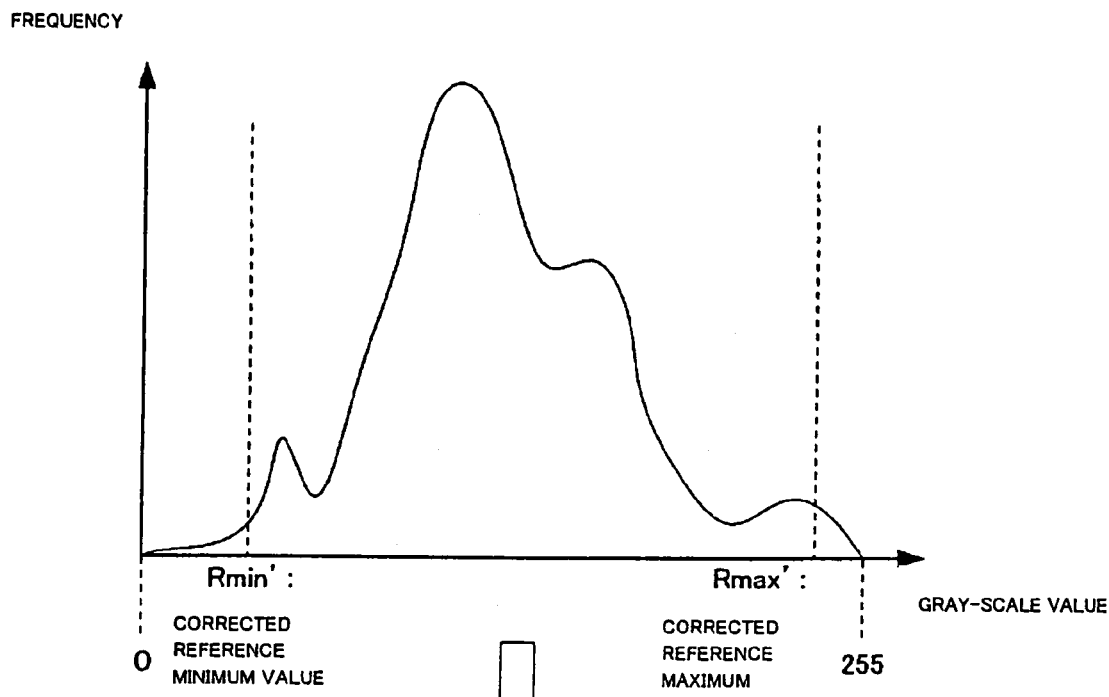
FIG. 5 illustrates image correction processing based on statistic data 10A.
Figure 5B:
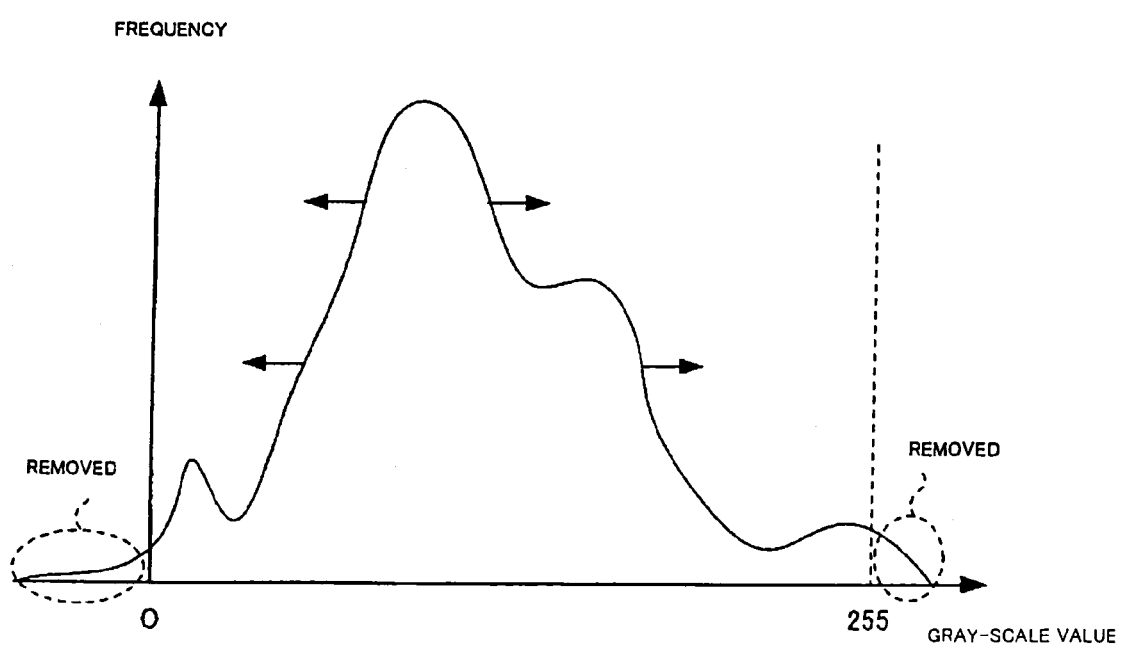

Image correction processing based on the correction parameter P will be described with reference to examples illustrated in FIG. 5. For example, the gray-scale values of the input image data GDin of one screen are distributed as illustrated in the histogram of FIG. 5(A). Therefore, it is possible to obtain the reference minimum value Rmin and the reference maximum value Rmax by performing the above-mentioned statistic calculations. In this case, as illustrated in FIG. 5(B), the image correcting unit 30 removes the shaded portion in which the gray-scale values are smaller than the reference minimum value Rmin and the highlighted portion in which the gray-scale values are larger than the reference maximum value Rmax.

Therefore, the correction parameter calculating unit 20 generates the look-up table LUT so that the minimum value of the output image data GDout is the corrected reference minimum value Rmin' and the maximum value thereof is the corrected reference maximum value Rmax'. To be specific, the correction parameter calculating unit 20 generates the look-up table LUT so that the input-output gray-scale characteristics of the image correction processing are described by the equations below.

$$GDout=fa*GDin-fb$$

$$fa=256/(Rmax'-Rmin')$$

$$fb=fa*Rmin$$

Furthermore, fa is the slope of the input-output gray-scale characteristics and fb is the intercept of the input-output gray-scale characteristics.

Figure 6:
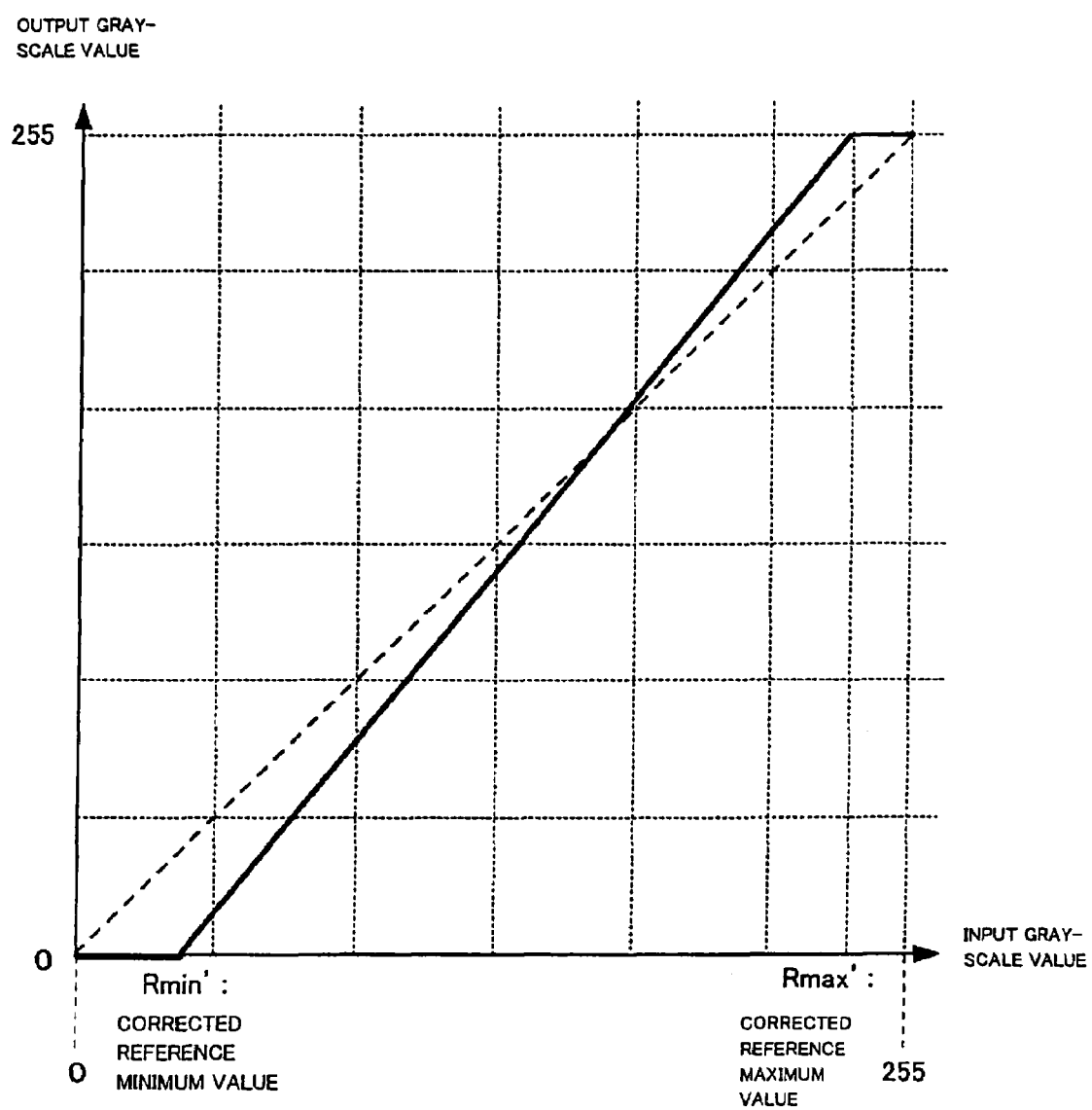
FIG. 6 is a graph illustrating an example of contents stored in a look-up table LUT used for the above-mentioned embodiment.

FIG. 6 illustrates an example of the contents stored in the look-up table LUT. In FIG. 6, a dotted line illustrates the input-output gray-scale characteristics when the image correction processing is not performed. A solid line illustrates the input-output gray-scale characteristics when the image correction processing is performed. As illustrated in FIG. 6, the gray-scale value of the output image data GDout is the minimum value '0' when the gray-scale value of the input image data GDin is in the range from the minimum value '0' to the corrected reference minimum value Rmin'. The gray-scale value of the output image data GDout is the maximum value '255' when the gray-scale value of the input image data GDin is in the range from the maximum value '255' to the corrected reference maximum value Rmax'. Therefore, the shaded portion and the highlighted portion are removed and the entire gray-scale is enlarged in the direction of the arrows illustrated in FIG. 6.

As mentioned above, according to the present embodiment, since the high-frequency components are removed from the statistical values such as the reference minimum value Rmin and the reference maximum value Rmax, it is possible to significantly simplify the structure of the image processing device compared with a case where the high-frequency components are removed during generating a histogram which is a source for obtaining the statistical values and thereby reduce the processing load. Furthermore, since a time constant of the low pass filter is controlled in accordance with the degree of change in the scene, it is possible to appropriately correct the images in accordance with the change in the scene.

An image processing device according to a second embodiment of the present invention will now be described. The image processing device according to the second embodiment is the same as the image processing device 100 according to the first embodiment illustrated in FIG. 1 excluding a calculating unit 22' which is used instead of the calculating unit 22.

Figure 7:
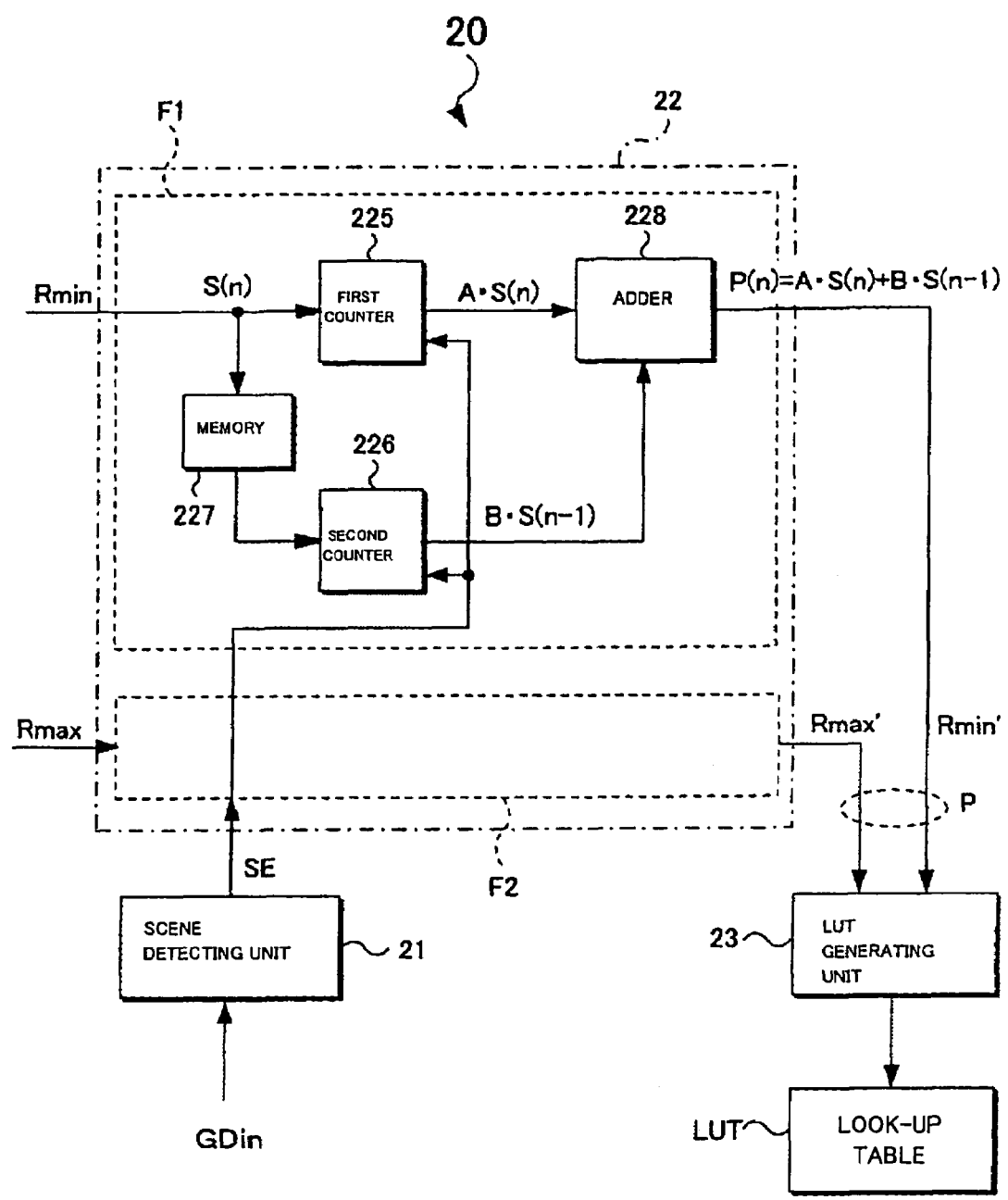
FIG. 7 is a block diagram illustrating the structure of a correction parameter calculating unit 20' used for a second embodiment of the present invention.

FIG. 7 is an exemplary block diagram illustrating a detailed structure of the correction parameter calculating unit 20 according to the second embodiment. The same elements as those illustrated in FIG. 3 are denoted by the same reference numerals. The calculating unit 22' according to the present embodiment includes a first low pass filter f1 and a second low pass filter f2. The first and second low pass filters f1 and f2 prevent occurrence of rapid changes in the reference minimum value Rmin and the reference maximum value Rmax thereby generating the correction parameter P. The first low pass filter f1 includes a first counter 225, a second counter 226, an adder 228, and a memory 227. Furthermore, since the structure of the second low pass filter f2 is the same as that of the first low pass filter f1, the detailed description of the second low pass filter f2 is omitted.

The memory 227 stores the reference minimum value Rmin of a frame prior to the current frame by one frame. When the reference minimum value Rmin of the current frame is S(n) and the reference minimum value Rmin of the frame prior to the current frame by one frame is S(n−1), the correction parameter P(n) of the current frame is obtained by the following equations.

$$P(n)=A*S(n)+B*S(n-1) \text{ and } 1=A+B$$

The values of the first coefficient A and the second coefficient B are selected based on the control signal SE as illustrated in the first embodiment. For example, when the value of the control signal SE is '0' (when almost no changes occur in scenes), $A=B=\frac{1}{2}$. When the value of the control signal SE is '1' (when change occurs a little in the scene), $A=\frac{3}{4}$ and $B=\frac{1}{4}$. Furthermore, when the value of the control signal SE is '2' (when change occurs in the scene), $A=1$ and $B=0$. That is, as the degree of change in the scene, which is represented by the control signal SE, is large, it is preferable to generate the correction parameter P by performing calculations in which the weighting of the statistic data of a previous frame is small.

As mentioned above, like in the first embodiment, in the second embodiment, since the high-frequency components are removed from the statistical values, such as the reference minimum value Rmin and the reference maximum value Rmax, it is possible to significantly simplify the structure of the image processing device compared with the case where the high-frequency components are removed in the process of generating the histogram, which is the source for obtaining the statistical values, and thereby reduce the processing load. Furthermore, since the time constant of the low pass filter is controlled in accordance with the degree of change in the scene, it is possible to appropriately correct the images in accordance with change in the scene.

Furthermore, it should be understood that the present invention is not limited to the first and second embodiments. For example, the following modifications can be made.

In the above-mentioned embodiments, the first coefficient A and the second coefficient B may be changed in consideration of the frame rate of the input image data GDin. For example, as illustrated in FIG. 8, a first basic constant A1 and a second basic constant B1 may be determined. A multiplication of the first coefficient A, which is determined by the first basic constant A1 and the control signal SE, instead of the first coefficient A and a multiplication of the second coefficient B, which is determined by the second basic constant B1 and the control signal SE, instead of the second coefficient B may be used. As a result, it is possible to increase the equalizing degree of the correction parameter by increasing the time constant of the low pass filter as the frame rate is reduced. This is because it is preferable to increase the time constant of the low pass filter since a correlation among frames is reduced when the frame rate is reduced.

According to the above-mentioned embodiments, a process in the correction parameter calculating unit 20 is performed by hardware, however, it may also be performed by software. In this case, the CPU is preferably operated by a predetermined image processing program.

The above-mentioned embodiments are preferably used for electronic apparatuses having liquid crystal panels, electroluminescent (EL) panels, digital micro mirror device (DMD) panels, and various electro-optical panels using fluorescence caused by plasma light emission or electron emission. In this case, the electronic apparatus includes a timing signal generating circuit for generating a control signal to control an electro-optical panel based on the output image data GDout, an image signal generating circuit for generating an image signal supplied from the output image data GDout to the electro-optical panel, a driving circuit for driving the electro-optical panel, and the electro-optical panel. The electronic apparatuses are, for example, mobile personal computers, mobile telephones, televisions, view finder type or monitor direct view type video tape recorders, car navigation devices, pagers, electronic organizers, calculating units, word processors, work stations, picture telephones, POS terminals, and devices having touch panels.

What is claimed is:

1. An image processing device for performing image processing on image data, the image processing device comprising:

a statistical value calculating device that performs statistical processing on the image data to generate statistical value data representing statistical values;

a scene detecting device that generates a control signal in accordance with a degree of change in a scene based on the image data;

a correction parameter calculating device that weights statistical value data of a plurality of frames based on the control signal to calculate a correction parameter; and an image correcting device that performs image correction processing on the image data based on the correction parameter; and the correction parameter calculating device comprises:
- a storing device that stores statistical value data obtained in a previous frame;
- a counting device that multiplies coefficients by statistical value data in the current frame and previous statistical value data read from the storing device, respectively; and
- a coefficient controlling device that changes the coefficients based on the control signal.

2. The image processing device according to claim 1, the correction parameter calculating device generating the correction parameter by performing calculations in which the weighting on statistical value data of a previous frame is small when the degree of change in the scene represented by the control signal is large.

3. The image processing device according to claim 1, wherein, when statistical value data of the current frame is $S(n)$, a correction parameter of the frame prior to the current frame by one frame is $P(n-1)$, a first coefficient is $A$, and a second coefficient is $B$, the correction parameter calculating device calculates a correction parameter $P(n)$ of the current frame in accordance with the equations $P(n)=A*S(n)+B*P(n-1)$ and $1=A+B$ and controls the values of the first coefficient and the second coefficient based on the control signal.

4. The image processing device according to any claim 1, the correction parameter calculating device detecting a frame rate of the image data and weighting the statistical value data of the plurality of frames based on the detected frame rate and the control signal.

5. An image processing method of performing image processing on image data, the method comprising:
- performing statistical processing on the image data to generate statistical value data representing statistical values;
- generating a control signal in accordance with a degree of change in a scene based on the image data;
- weighting the statistical value data of a plurality of frames based on the control signal to calculate a correction parameter; and
- performing image correction processing on the image data based on the correction parameter; and the performing image correction processing comprises:
- storing statistical value data obtained in a previous frame;
- multiplying coefficients by statistical value data in the current frame and previous statistical value data read from the storing device, respectively; and
- changing the coefficients based on the control signal.

6. A computer-readable medium that stores a program for performing image processing on image data, the program including instructions that cause a computer to:
- perform statistical processing on the image data to generate statistical value data representing statistical values;
- generate a control signal in accordance with the degree of change in a scene based on the image data;
- weight the statistical value data of a plurality of frames based on the control signal to calculate a correction parameter; and
- perform image correction processing on the image data based on the correction parameter; and the instruction to perform image correction processing comprises:

storing statistical value data obtained in a previous frame;

multiplying coefficients by statistical value data in the current frame and previous statistical value data read from the storing device, respectively; and changing the coefficients based on the control signal.

* * * * *